(12) United States Patent
Hanrahan (10) Patent No.: US 12,492,663 B2
(45) Date of Patent: Dec. 9, 2025

(54) AIRCRAFT PROPULSION SYSTEM GEARTRAIN

(71) Applicant: RTX Corporation, Farmington, CT (US)

(72) Inventor: Paul R. Hanrahan, Sedona, AZ (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/233,662

(22) Filed: Aug. 14, 2023

(65) Prior Publication Data

US 2024/0052784 A1 Feb. 15, 2024

Related U.S. Application Data

(60) Provisional application No. 63/397,650, filed on Aug. 12, 2022.

(51) Int. Cl.
*F02C 7/32* (2006.01)
*B64D 35/04* (2006.01)
(Continued)

(52) U.S. Cl.
CPC ............. *F02C 7/32* (2013.01); *B64D 35/04* (2013.01); *F01D 11/02* (2013.01); *F01D 25/164* (2013.01); *F02C 3/04* (2013.01); *F02C 7/06* (2013.01); *F02C 7/28* (2013.01); *F02C 7/36* (2013.01); *F16J 15/54* (2013.01); *F05D 2220/90* (2013.01); *F05D 2230/64* (2013.01); *F05D 2230/644* (2013.01); *F05D 2240/54* (2013.01); *F05D 2240/55* (2013.01);
(Continued)

(58) Field of Classification Search
CPC ....... B64D 35/04; F01D 11/02; F01D 25/164; F02C 3/04; F02C 7/28; F02C 7/32; F02C 7/36; F02C 7/06; F05D 2220/90; F05D 2230/64; F05D 2230/664; F05D 2240/54; F05D 2240/55; F05D 2260/4031; F05D 2260/53; F05D 2300/501; F16J 15/54
See application file for complete search history.

(56) References Cited

U.S. PATENT DOCUMENTS

| | | | |
|---|---|---|---|
| 4,651,521 A | | 3/1987 | Ossi |
| 5,211,535 A | * | 5/1993 | Martin .................... F01D 11/02 415/174.4 |

(Continued)

FOREIGN PATENT DOCUMENTS

EP    2535528 B1    4/2021

OTHER PUBLICATIONS

EP Search Report for EP Patent Application No. 23191415.1 dated Jan. 17, 2024.

*Primary Examiner* — Jason H Duger
(74) *Attorney, Agent, or Firm* — Getz Balich LLC (57) ABSTRACT

An assembly is provided for an aircraft. This assembly includes a first rotating structure, a second rotating structure and a seal assembly. The seal assembly is configured to seal an annular gap radially between the first rotating structure and the second rotating structure. The seal assembly includes an arm, a seal element and a seal land. The arm is cantilevered from and extends axially along the second rotating structure. The seal element is connected to the arm and forms a seal interface with the seal land. The seal land is connected to the first rotating structure.

6 Claims, 11 Drawing Sheets

(51) Int. Cl.
    *F01D 11/02*     (2006.01)
    *F01D 25/16*     (2006.01)
    *F02C 3/04*     (2006.01)
    *F02C 7/06*     (2006.01)
    *F02C 7/28*     (2006.01)
    *F02C 7/36*     (2006.01)
    *F16J 15/54*     (2006.01)

(52) U.S. Cl.
    CPC .. *F05D 2260/4031* (2013.01); *F05D 2260/53* (2013.01); *F05D 2300/501* (2013.01)

(56) References Cited

U.S. PATENT DOCUMENTS

| | | | |
|---|---|---|---|
| 6,270,037 B1 | 8/2001 | Freese | |
| 10,138,757 B2 | 11/2018 | Witlicki | |
| 10,215,054 B2 | 2/2019 | Anglin | |
| 10,663,054 B2 | 5/2020 | Gravina | |
| 10,954,813 B2 | 3/2021 | Wuestenberg | |
| 11,186,378 B2 | 11/2021 | Dubreuil | |
| 11,199,103 B2 | 12/2021 | Wolfer | |
| 2003/0049118 A1* | 3/2003 | Bruno | F02C 7/28 415/230 |
| 2005/0047911 A1* | 3/2005 | Cabe | F02C 7/28 415/174.2 |
| 2011/0206498 A1* | 8/2011 | McCooey | F02K 3/06 475/348 |
| 2013/0259654 A1* | 10/2013 | Kupratis | F02K 3/06 415/122.1 |
| 2016/0169040 A1* | 6/2016 | Anglin | F04D 29/102 415/230 |
| 2020/0017229 A1 | 1/2020 | Steinert | |
| 2020/0088053 A1 | 3/2020 | Fiore | |
| 2020/0240427 A1 | 7/2020 | Teuber | |
| 2020/0362714 A1* | 11/2020 | Hilbert | F01D 11/001 |
| 2020/0362716 A1* | 11/2020 | Glahn | F16J 15/36 |
| 2021/0071546 A1* | 3/2021 | Brault | F02C 7/28 |
| 2021/0087977 A1 | 3/2021 | Becoulet | |
| 2022/0235699 A1 | 7/2022 | Desjardins | |
| 2022/0235711 A1* | 7/2022 | Becoulet | F16H 57/0486 |

\* cited by examiner

AIRCRAFT PROPULSION SYSTEM GEARTRAIN

This application claims priority to U.S. Provisional Patent Application No. 63/397,650 filed Aug. 12, 2022, which is hereby incorporated herein by reference in its entirety.

BACKGROUND OF THE DISCLOSURE

1. Technical Field

This disclosure relates generally to a gas turbine engine and, more particularly, to a seal assembly for the gas turbine engine.

2. Background Information

Various types and configurations of seal assemblies for a gas turbine engine are known in the art. While these known seal assemblies have various benefits, there is still room in the art for improvement.

SUMMARY OF THE DISCLOSURE

According to an aspect of the present disclosure, an assembly is provided for an aircraft. This aircraft assembly includes a first rotating structure, a second rotating structure and a seal assembly. The seal assembly is configured to seal an annular gap radially between the first rotating structure and the second rotating structure. The seal assembly includes an arm, a seal element and a seal land. The arm is cantilevered from and extends axially along the second rotating structure. The seal element is connected to the arm and forms a seal interface with the seal land. The seal land is connected to the first rotating structure.

According to another aspect of the present disclosure, another assembly is provided for an aircraft. This aircraft assembly includes a first rotating structure, a second rotating structure and a seal assembly. The first rotating structure is rotatable about a first axis. The second rotating structure is rotatable about a second axis. The seal assembly is configured to seal an annular gap radially between the first rotating structure and the second rotating structure. The seal assembly is further configured to accommodate misalignment between the first axis and the second axis. The seal assembly includes a seal land, a seal element and a flexible member connecting the seal element to the second rotating structure. The seal land is arranged with the first rotating structure. The seal element is configured to provide a seal interface with the seal land.

According to still another aspect of the present disclosure, another assembly is provided for an aircraft. This aircraft assembly includes a geartrain, a first rotating structure, a second rotating structure, a turbine rotor and a seal assembly. The geartrain includes a first element, a second element and a third element. The first rotating structure is coupled to the first element. The second rotating structure is coupled to the second element. The turbine rotor is coupled to the third element. The turbine rotor is configured to drive rotation of the first rotating structure and the second rotating structure through the geartrain. The seal assembly is configured to seal an annular gap radially between the first rotating structure and the second rotating structure.

The seal assembly may include a flexible arm, a seal element and a seal land. The flexible arm may project out from and extend axially along the first rotating structure. The seal element may be connected to the flexible arm and form a seal interface with the seal land. The seal land may be arranged with the second rotating structure.

The seal assembly may be configured as or otherwise include a bearing.

The flexible member may be configured as or otherwise include an arm cantilevered from the second rotating structure.

The aircraft assembly may also include a bearing disposed radially between the flexible member and the first rotating structure. The bearing may locate a portion of the flexible member, axially proximate the seal element, relative to the first rotating structure.

The seal assembly may be configured to accommodate misalignment between a centerline axis of the first rotating structure and a centerline axis of the second rotating structure.

The aircraft assembly may also include a bearing disposed radially between the arm and the first rotating structure. The bearing may support the arm relative to the first rotating structure.

The arm may extend axially along the second rotating structure between a first arm end and a second arm end. The arm may be connected to the second rotating structure at the first arm end. The seal element may be connected to the arm at the second arm end.

The seal assembly may also include a bearing disposed radially between the first rotating structure and the arm. The bearing may be located axially proximate the second arm end.

The bearing may be configured as or otherwise include a rolling element bearing.

The arm may have an axial length between the first arm end and the second arm end. The axial length may be greater than a radial distance between the second rotating structure and the arm.

The axial length may be greater than ten times the radial distance between the second rotating structure and the arm.

The arm may have an axial length between the first arm end and the second arm end. The axial length may be greater than a radial distance between the first rotating structure and the arm.

The axial length may be greater than four times the radial distance between the first rotating structure and the arm.

The arm may be non-perforated.

A stiffness of the arm may be tuned for rotordynamic benefit.

The seal element may be configured as or otherwise include a knife edge seal element.

The seal element may be one of a plurality of seal elements connected to the arm and forming the seal interface with the seal land.

The first rotating structure may be configured as or otherwise include a first shaft. The seal land may be connected to the first shaft. The second rotating structure may be configured as or otherwise include a second shaft. The arm may be cantilevered from the second shaft.

The aircraft assembly may also include a geartrain. The geartrain may include a first element and a second element. The first rotating structure may be coupled to the first element. The second rotating structure may be coupled to the second element.

The geartrain may also include a carrier, a sun gear, a ring gear and a plurality of intermediate gears between and meshed with the sun gear and the ring gear. Each of the intermediate gears may be rotatably mounted to the carrier. The first element may be configured as or otherwise include the carrier. The second element may be configured as or otherwise include the sun gear.

The aircraft assembly may also include an engine core. The engine core may include a turbine rotor, a compressor section, a combustor section, a turbine section and a flowpath extending through the compressor section, the combustor section and the turbine section. The turbine rotor may be within the turbine section. The turbine rotor may be configured to drive rotation of the first rotating structure and the second rotating structure through the geartrain.

The aircraft assembly may also include a first propulsor rotor and a second propulsor rotor. The first propulsor rotor may be configured to be rotatably driven through the first rotating structure. The second propulsor rotor may be configured to be rotatably driven through the second rotating structure.

The second rotating structure may extend axially through a bore of the first rotating structure.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
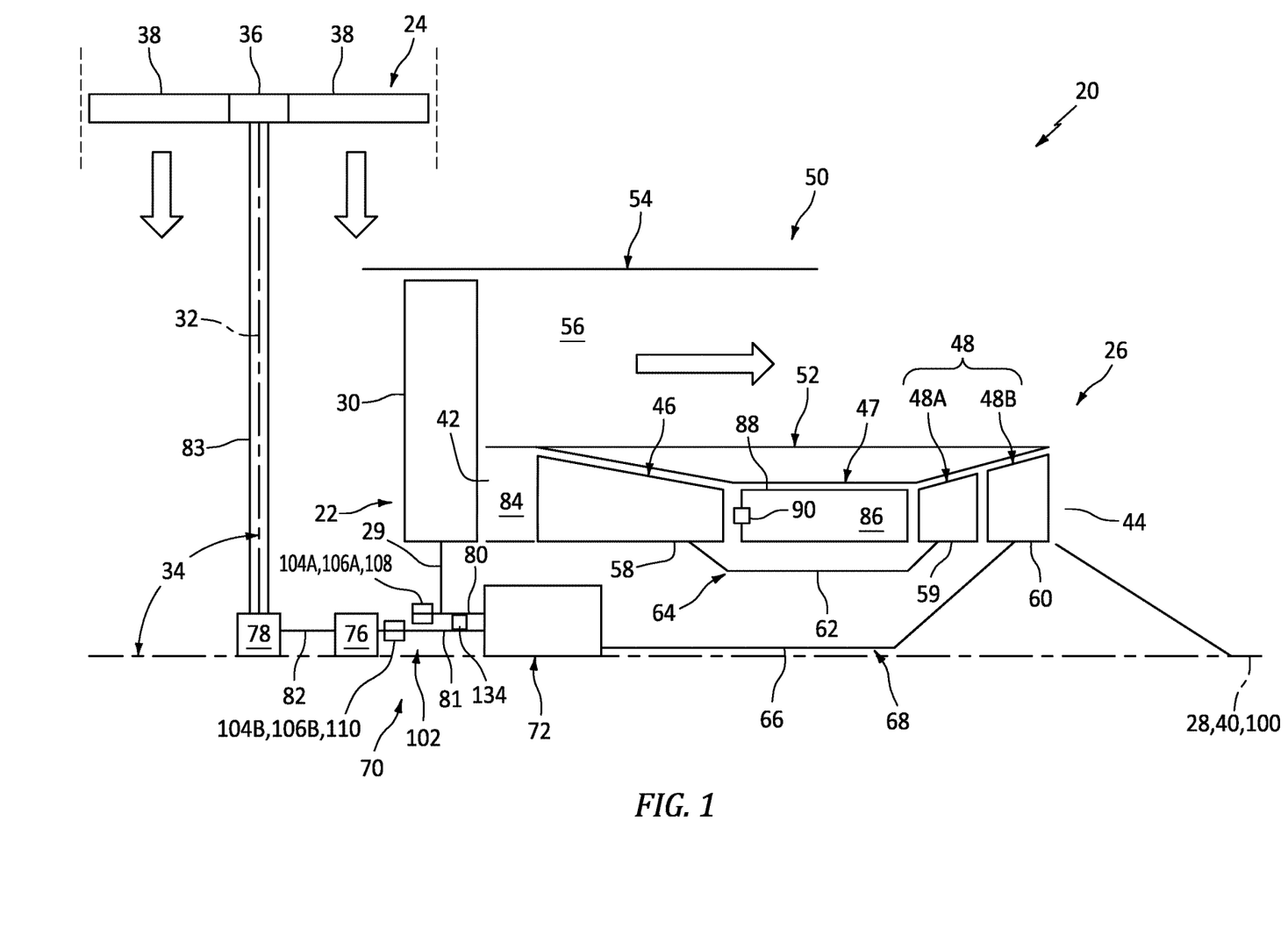
FIG. 1 is a partial, schematic illustration of an aircraft propulsion system.

FIG. 1 schematically illustrates a propulsion system 20 for an aircraft. The aircraft may be an airplane, a helicopter, a drone (e.g., an unmanned aerial vehicle (UAV)), a spacecraft or any other manned or unmanned aerial vehicle. This aircraft may be configured as a vertical take-off and landing (VTOL) aircraft or a short take-off and vertical landing (STOVL) aircraft. The aircraft propulsion system 20 of FIG. 1, for example, is configured to generate power for first direction propulsion (e.g., propulsive thrust) during a first mode of operation and to generate power for second direction propulsion (e.g., propulsive lift) during a second mode of operation, where the first direction is different than (e.g., angularly offset from) the second direction. The first mode may be a horizontal flight mode (e.g., a forward flight mode) where the first direction propulsion is substantially horizontal propulsive thrust; e.g., within five degrees (5°), ten degrees (10°), etc. of a horizontal axis. The second mode may be a vertical flight and/or hover mode where the second direction propulsion is substantially vertical propulsive lift; e.g., within five degrees (5°), ten degrees (10°), etc. of a vertical axis. The aircraft propulsion system 20, of course, may also be configured to generate both the first direction propulsion (e.g., horizontal propulsion) and the second direction propulsion (e.g., vertical propulsion) during a third mode (e.g., a transition mode) of operation.

The aircraft propulsion system 20 of FIG. 1 includes one or more bladed propulsor rotors such as, for example, at least one bladed first propulsor rotor 22 and at least one bladed second propulsor rotor 24. The aircraft propulsion system 20 of FIG. 1 also includes a gas turbine engine core 26 configured to rotatably drive the one or more propulsor rotors—the first propulsor rotor 22 and/or the second propulsor rotor 24.

The first propulsor rotor 22 may be configured as a ducted rotor such as a fan rotor. The first propulsor rotor 22 of FIG. 1 is rotatable about a first rotor axis 28. This first rotor axis 28 is an axial centerline of the first propulsor rotor 22 and may be horizontal when the aircraft is on ground and/or during level aircraft flight. The first propulsor rotor 22 includes at least a first rotor disk 29 and a plurality of first rotor blades 30 (one visible in FIG. 1); e.g., fan blades. The first rotor blades 30 are distributed circumferentially around the first rotor disk 29 in an annular array. Each of the first rotor blades 30 is connected to and projects radially (relative to the first rotor axis 28) out from the first rotor disk 29.

The second propulsor rotor 24 may be configured as an open rotor such as a propeller rotor or a helicopter (e.g., main) rotor. Of course, in other embodiments, the second propulsor rotor 24 may alternatively be configured as a ducted rotor such as a fan rotor; e.g., see dashed line duct. The second propulsor rotor 24 of FIG. 1 is rotatable about a second rotor axis 32. This second rotor axis 32 is an axial centerline of the second propulsor rotor 24 and may be vertical when the aircraft is on the ground and/or during level aircraft flight. The second rotor axis 32 is angularly offset from the first rotor axis 28 by an included angle 34; e.g., an acute angle or a right angle. This included angle 34 may be between sixty degrees (60°) and ninety degrees (90°); however, the present disclosure is not limited to such an exemplary relationship. The second propulsor rotor 24 includes at least a second rotor disk 36 and a plurality of second rotor blades 38; e.g., open rotor blades. The second rotor blades 38 are distributed circumferentially around the second rotor disk 36 in an annular array. Each of the second rotor blades 38 is connected to and projects radially (relative to the second rotor axis 32) out from the second rotor disk 36.

The engine core 26 extends axially along a core axis 40 between a forward, upstream airflow inlet 42 and an aft, downstream exhaust 44. The core axis 40 may be an axial centerline of the engine core 26 and may be horizontal when the aircraft is on the ground and/or during level aircraft flight. This core axis 40 may be parallel (e.g., coaxial) with the first rotor axis 28 and, thus, angularly offset from the second rotor axis 32. The engine core 26 of FIG. 1 includes a compressor section 46, a combustor section 47 and a turbine section 48. The turbine section 48 of FIG. 1 includes a high pressure turbine (HPT) section 48A and a low pressure turbine (LPT) section 48B (also sometimes referred to as a power turbine section).

The engine sections 46-48B are arranged sequentially along the core axis 40 within an engine housing 50. This engine housing 50 includes an inner case 52 (e.g., a core case) and an outer case 54 (e.g., a fan case). The inner case 52 may house one or more of the engine sections 46-48B; e.g., the engine core 26. The outer case 54 may house the first propulsor rotor 22. The outer case 54 of FIG. 1 also axially overlaps and extends circumferentially about (e.g., completely around) the inner case 52 thereby at least partially forming a bypass flowpath 56 (e.g., an annular bypass flowpath) radially between the inner case 52 and the outer case 54.

Each of the engine sections 46, 48A and 48B includes a bladed rotor 58-60 within that respective engine section 46, 48A, 48B. Each of these bladed rotors 58-60 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 58 is connected to the HPT rotor 59 through a high speed shaft 62. At least (or only) these engine components 58, 59 and 62 collectively form a high speed rotating structure 64. This high speed rotating structure 64 is rotatable about the core axis 40. The LPT rotor 60 is connected to a low speed shaft 66. At least (or only) these engine components 60 and 66 collectively form a low speed rotating structure 68. This low speed rotating structure 68 is rotatable about the core axis 40. The low speed rotating structure 68 and, more particularly, its low speed shaft 66 may project axially through a bore of the high speed rotating structure 64 and its high speed shaft 62.

The aircraft propulsion system 20 of FIG. 1 includes a powertrain 70 that couples the low speed rotating structure 68 to the first propulsor rotor 22 and that couples the low speed rotating structure 68 to the second propulsor rotor 24. The powertrain 70 of FIG. 1 includes a geartrain 72, a transmission 76 and a gearing 78; e.g., bevel gearing. The powertrain 70 of FIG. 1 also includes one or more shafts 80-83 and/or other torque transmission devices for coupling the geartrain 72 to the first propulsor rotor 22 and the second propulsor rotor 24.

An input to the geartrain 72 is coupled to the low speed rotating structure 68 and its low speed shaft 66, where the low speed rotating structure 68 forms a power input for the geartrain 72. A first output from the geartrain 72 is coupled to the first propulsor rotor 22 through the first propulsor shaft 80, where the first propulsor rotor 22 forms a first power output (e.g., load) for the geartrain 72. A second output from the geartrain 72 is coupled to the second propulsor rotor 24 through the powertrain elements 81, 76, 82, 78 and 83, where the second propulsor rotor 24 forms a second power output (e.g., load) for the geartrain 72.

An output of the transmission 76 is connected to the gearing 78 through the transmission output shaft 82. This transmission 76 may be configured to selectively couple (e.g., transfer mechanical power between) the geartrain output shaft 81 and the transmission output shaft 82. During the first mode of operation, for example, the transmission 76 may be configured to decouple the geartrain output shaft 81 from the transmission output shaft 82, thereby decoupling the low speed rotating structure 68 from the second propulsor rotor 24. During the second mode of operation (and the third mode of operation), the transmission 76 may be configured to couple the geartrain output shaft 81 with the transmission output shaft 82, thereby coupling the low speed rotating structure 68 with the second propulsor rotor 24. The transmission 76 may be configured as a clutched or clutchless transmission.

An output of the gearing 78 is connected to the second propulsor rotor 24 through the second propulsor shaft 83. This gearing 78 provides a coupling between the transmission output shaft 82 rotating about the axis 28, 40 and the second propulsor shaft 83 rotating about the second rotor axis 32. The gearing 78 may also provide a speed change mechanism between the transmission output shaft 82 and the second propulsor shaft 83. The gearing 78, however, may alternatively provide a 1:1 rotational coupling between the transmission output shaft 82 and the second propulsor shaft 83 such that these shafts 82 and 83 rotate at a common (e.g., the same) speed. Furthermore, in some embodiments, the gearing 78 and the transmission output shaft 82 may be omitted where the functionality of the gearing 78 is integrated into the transmission 76. In still other embodiments, the transmission 76 may be omitted where decoupling of the second propulsor rotor 24 is not required and/or where an optional additional speed change between the second output of the geartrain 72 and the second propulsor rotor 24 is not required.

During operation of the aircraft propulsion system 20, air enters the engine core 26 through the airflow inlet 42. This air is directed into a core flowpath 84 (e.g., an annular core flowpath) which extends sequentially through the compressor section 46, the combustor section 47, the HPT section 48A and the LPT section 48B to the exhaust 44. The air within this core flowpath 84 may be referred to as core air.

The core air is compressed by the compressor rotor 58 and directed into a combustion chamber 86 (e.g., an annular combustion chamber) of a combustor 88 (e.g., an annular combustor) in the combustor section 47. Fuel is injected into the combustion chamber 86 through one or more fuel injectors 90 (one visible in FIG. 1) and mixed with the compressed core air to provide a fuel-air mixture. This fuel-air mixture is ignited and combustion products thereof flow through and sequentially cause the HPT rotor 59 and the LPT rotor 60 to rotate. The rotation of the HPT rotor 59 drives rotation of the high speed rotating structure 64 and its compressor rotor 58. The rotation of the LPT rotor 60 drives rotation of the low speed rotating structure 68. The rotation of the low speed rotating structure 68 drives rotation of the first propulsor rotor 22 through the geartrain 72 during a select mode or modes of operation; e.g., the first and the third modes of operation. The rotation of the low speed rotating structure 68 drives rotation of the second propulsor rotor 24 through the geartrain 72 during a select mode or modes of operation; e.g., the second and the third modes of operation. During the first mode of operation, the transmission 76 may decouple the low speed rotating structure 68 from the second propulsor rotor 24 such that the low speed rotating structure 68 does not drive rotation of the second propulsor rotor 24. The second propulsor rotor 24 may thereby be stationary (or windmill) during the first mode of operation.

During the first and the third modes of operation, the rotation of the first propulsor rotor 22 propels bypass air (separate from the core air) through the aircraft propulsion system 20 and its bypass flowpath 56 to provide the first direction propulsion; e.g., the forward, horizontal thrust. During the second and the third modes of operation, the rotation of the second propulsor rotor 24 propels additional air (separate from the core air and the bypass air) to provide the second direction propulsion; e.g., vertical lift. The aircraft may thereby takeoff, land and/or otherwise hover during the second and the third modes of operation, and the aircraft may fly forward or otherwise move during the first and the third modes of operation.

Figure 2:
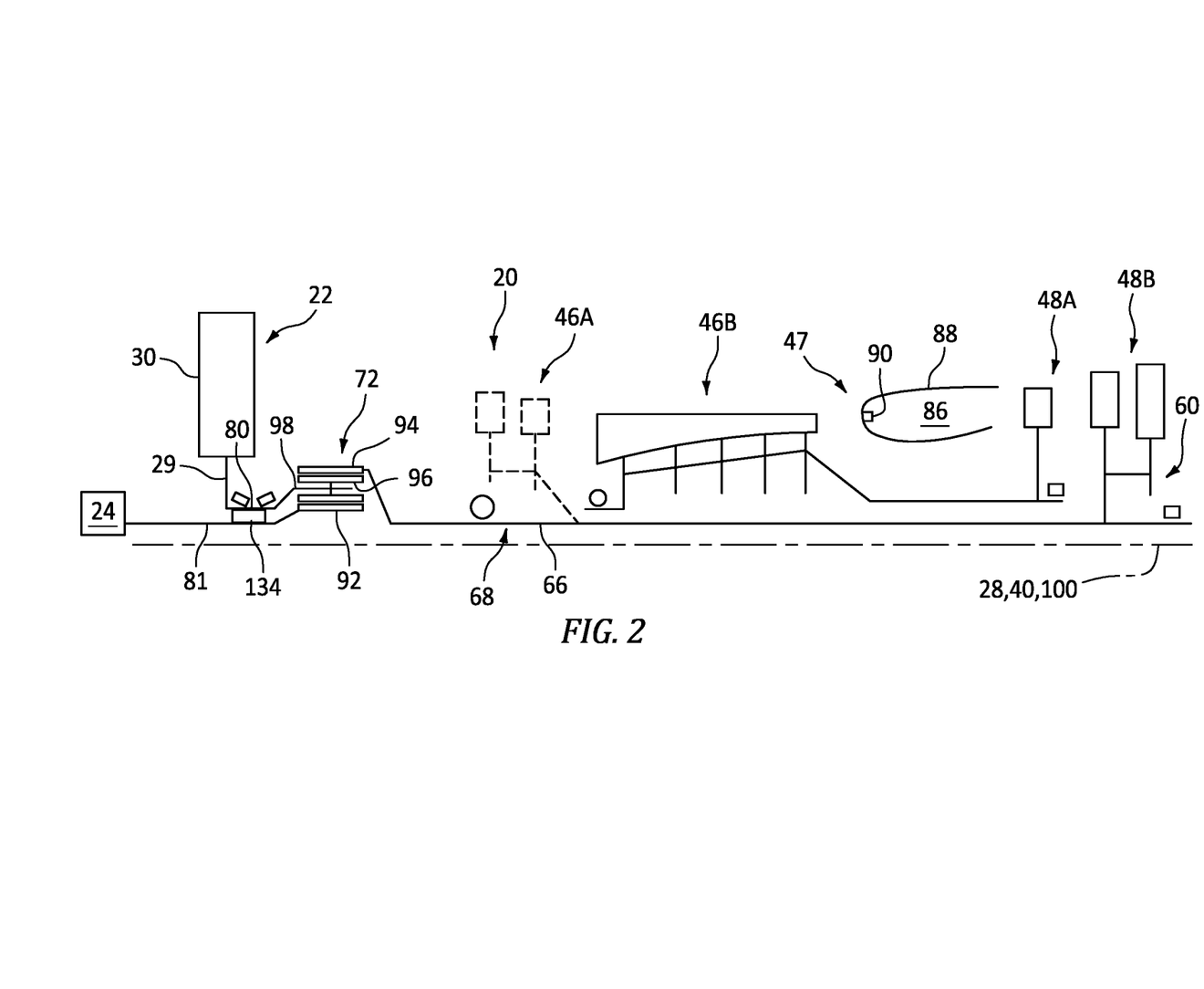
FIG. 2 is a schematic illustration of a portion of the aircraft propulsion system of FIG. 1 shown with an optional low pressure compressor section.
Figure 3:
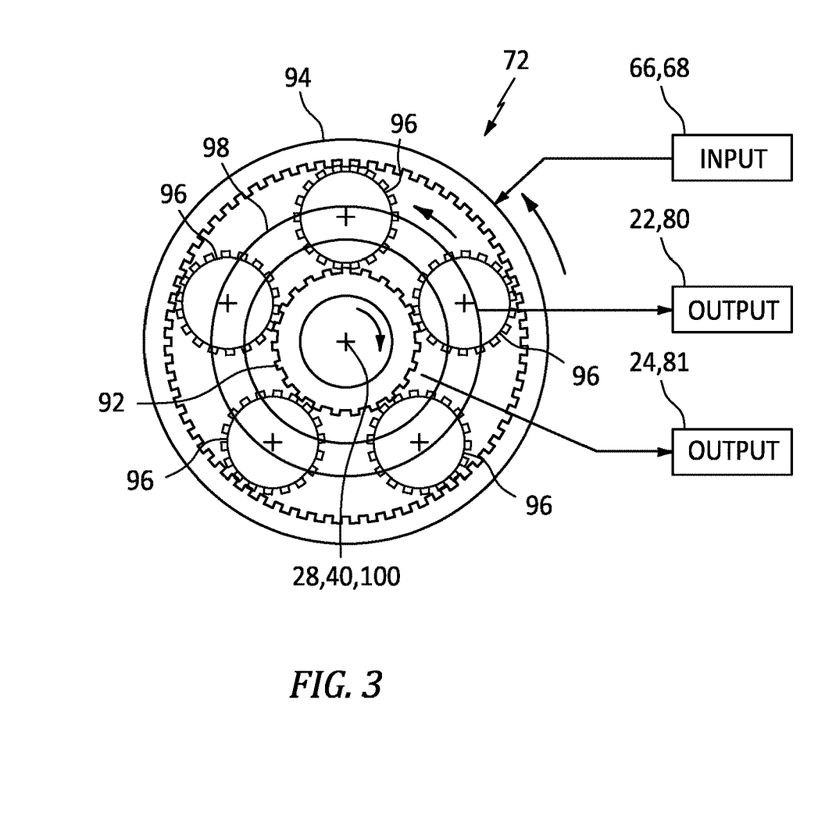
FIG. 3 is a schematic illustration of a geartrain coupled with a power input and one or more power outputs.

FIGS. 2 and 3 illustrate aspects of the geartrain 72 in further detail. The geartrain 72 of FIGS. 2 and 3 includes a sun gear 92, a ring gear 94, a plurality of intermediate gears 96 and a carrier 98. The sun gear 92 is rotatable about a rotational axis 100 of the geartrain 72, which rotational axis 100 may be parallel (e.g., coaxial) with the axis 28, 40. The ring gear 94 circumscribes the sun gear 92, and the ring gear 94 is rotatable about the axis 28, 40, 100. Each of the intermediate gears 96 is disposed (e.g., radially) between and meshed with the sun gear 92 and the ring gear 94. Each of the intermediate gears 96 is rotatably mounted to the carrier 98. The carrier 98 is rotatable about the axis 28, 40, 100. The first propulsor rotor 22 is coupled to and is configured to be rotatably driven by the carrier 98. The second propulsor rotor 24 is coupled to and is configured to be rotatably driven by the sun gear 92. The low speed rotating structure 68 and its LPT rotor 60 are coupled to and configured to rotatably drive the ring gear 94. With this arrangement, the geartrain 72 may provide a propulsor rotor (e.g., fan) to LPT rotor speed ratio capable of configuring the first propulsor rotor 22 with a relatively high pressure ratio (e.g., fan pressure ratio (FPR)) while rotating the low speed rotating structure 68 and its LPT rotor 60 at relatively fast rotational speeds.

Referring to FIG. 1, the aircraft propulsion system 20 may include a propulsor rotation control system 102. This propulsor rotation control system 102 may include one or more brakes 104A and 104B (generally referred to as "104") and/or one or more lock devices 106A and 106B (generally referred to as "106").

Figure 4:
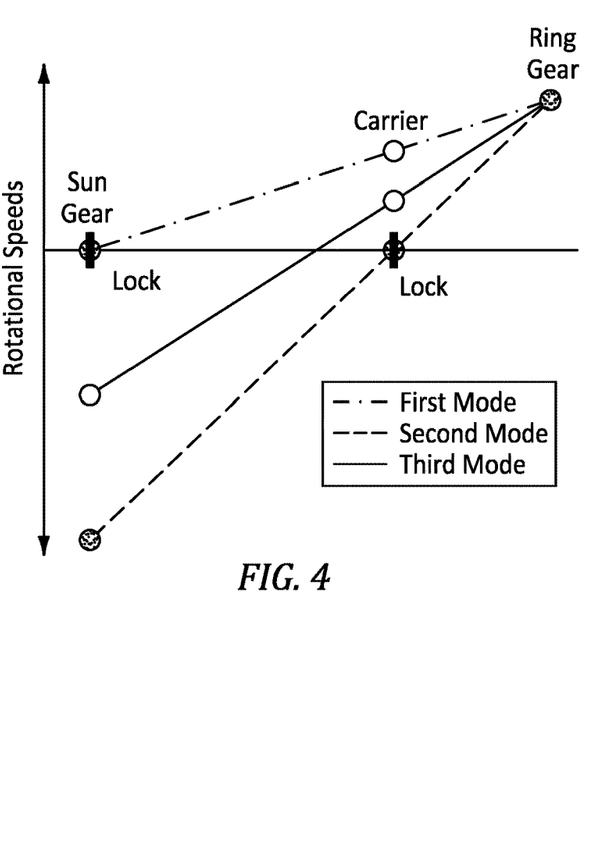
FIG. 4 is a graph depicting changes to rotational speeds during various modes of propulsion system operation.

The first brake 104A and/or the first lock device 106A may be located at location 108, or another suitable location. The first brake 104A is configured to brake (e.g., slow and/or stop) rotation of the first propulsor rotor 22 about the axis 28, 40, 100. The first lock device 106A is configured to lock (e.g., fix, prevent) rotation of the first propulsor rotor 22 about the axis 28, 40, 100, for example, following the braking of the first propulsor rotor 22 to a zero rotational speed about the axis 28, 40, 100 using the first brake 104A. When the first propulsor rotor 22 is rotationally fixed (e.g., during the second mode of operation of FIG. 4), the geartrain 72 may transfer (e.g., all, minus losses in the powertrain 70) the power output from the low speed rotating structure 68 and its LPT rotor 60 to the second propulsor rotor 24 and the powertrain element(s) therebetween.

The second brake 104B and/or the second lock device 106B may be located at location 110, or another suitable location. The second brake 104B is configured to brake (e.g., slow and/or stop) rotation of the second propulsor rotor 24 about the axis 32. The second lock device 106B is configured to lock (e.g., fix, prevent) rotation of the second propulsor rotor 24 about the axis 32, for example, following the braking of the second propulsor rotor 24 to a zero rotational speed about the axis 32. When the second propulsor rotor 24 is rotationally fixed (e.g., during the first mode of operation of FIG. 4), the geartrain 72 may transfer (e.g., all, minus losses in the powertrain 70) the power output from the low speed rotating structure 68 and its LPT rotor 60 to the first propulsor rotor 22 and the powertrain element(s) therebetween.

To enter the third mode of operation from the first mode of operation, the second lock device 106B may be disengaged and/or the second brake 104B may be released. The second propulsor rotor 24 may thereby begin to rotate along with the already rotating first propulsor rotor 22. Similarly, to enter the third mode of operation from the second mode of operation, the first lock device 106A may be disengaged and/or the first brake 104A may be released. The first propulsor rotor 24 may thereby begin to rotate along with the already rotating second propulsor rotor 24. When both of the propulsor rotors 22 and 24 are rotating/free to rotate (e.g., during the third mode of operation of FIG. 4), the geartrain 72 may transfer (e.g., all, minus losses in the powertrain 70) the power output from the low speed rotating structure 68 and its LPT rotor 60 to (I) the first propulsor rotor 22 and the powertrain element(s) therebetween and (II) the second propulsor rotor 24 and the powertrain element(s) therebetween.

Figure 5:
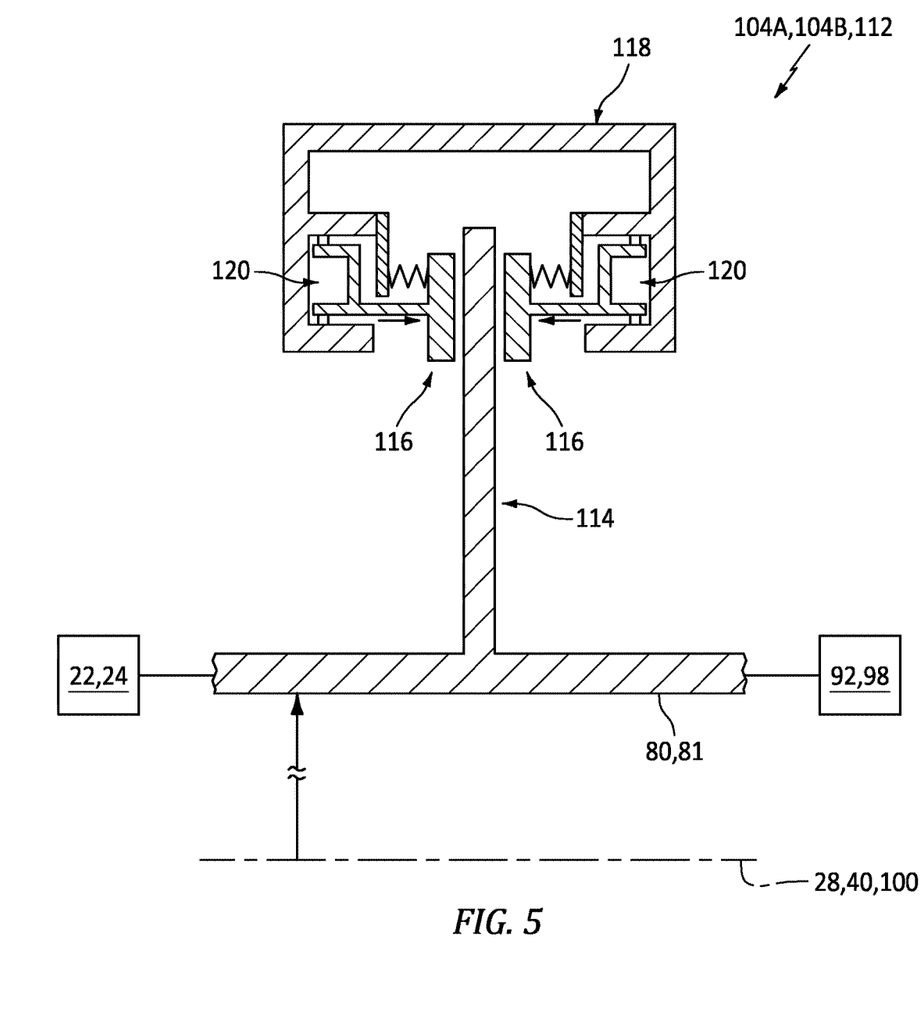
FIG. 5 is a partial sectional illustration of a rotating assembly configured with a brake.

Referring to FIG. 5, the first brake 104A and/or the second brake 104B may each be configured as or otherwise include a disk brake 112. The disk brake 112 of FIG. 5 includes a brake rotor 114 and one or more brake pads 116. The brake rotor 114 is configured rotatable with the respective propulsor rotor 22, 24. The brake rotor 114, for example, may be connected to and rotatable with the respective shaft 80, 81, or another rotating element (directly or indirectly) rotatable with the respective propulsor rotor 22, 24. The brake pads 116 are anchored to a stationary structure 118, which may be part of the engine housing 50 and/or an airframe of the aircraft (see FIG. 1). The brake pads 116 may be actuated by one or more brake actuators 120 (e.g., hydraulic brake actuators) to move the brake pads 116 from an open position to a closed position. In the open position, the brake pads 116 are spaced from and do not engage (e.g., contact) the brake rotor 114 (see position of FIG. 5). In the closed position, the brake pads 116 engage (e.g., contact) and clamp onto (e.g., squeeze) the brake rotor 114. Frictional rubbing between the brake pads 116 and the brake rotor 114 is operable to brake rotation of the brake rotor 114 and, thus, the respective shaft 80, 81 (or other rotating element) connected thereto. The first and the second brakes 104 of the present disclosure, however, are not limited to such an exemplary disk brake configuration. Furthermore, it is contemplated the first and/or the second brake 104 may alternatively be configured as another type of brake such as, for example, a drum brake.

Figure 6:
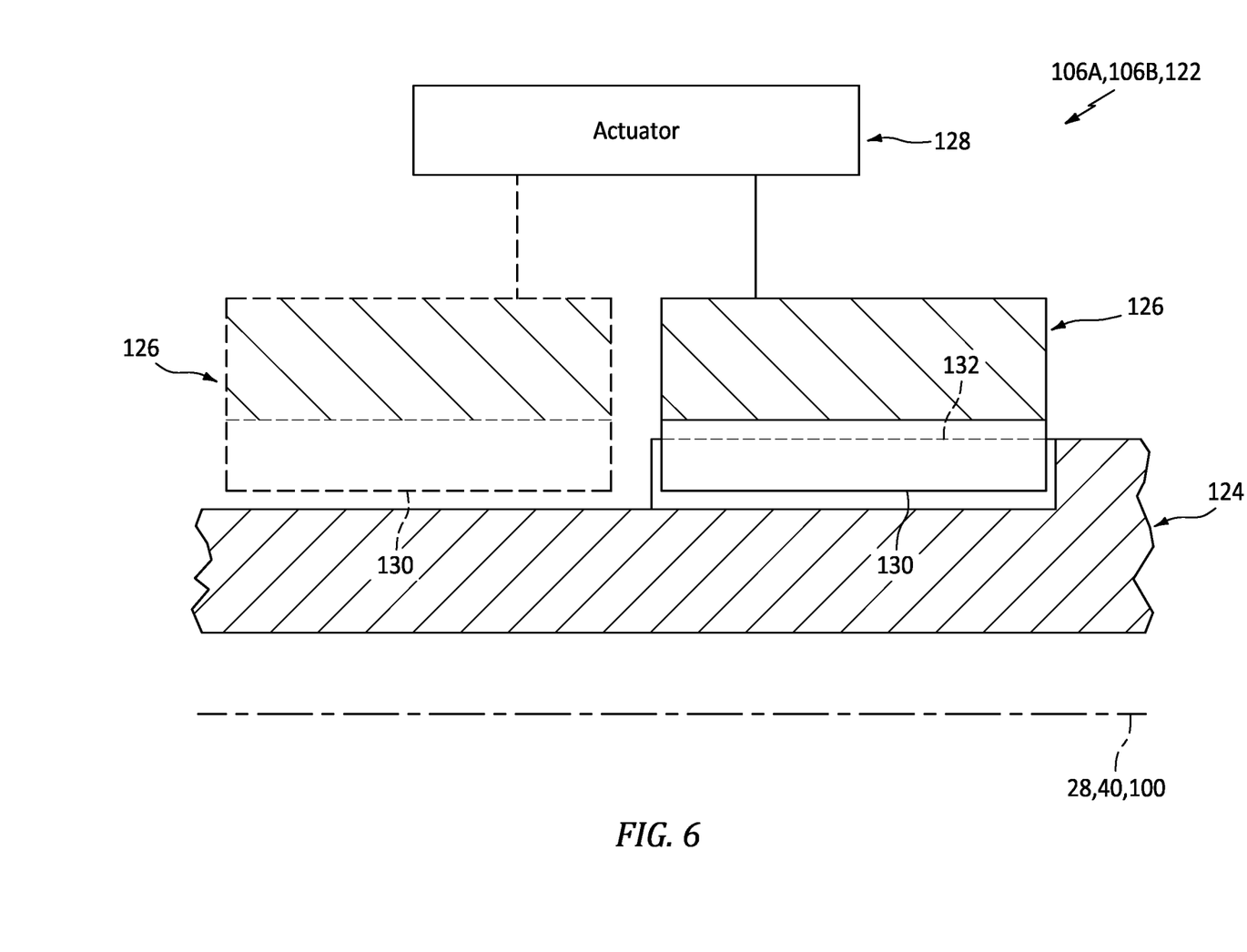
FIG. 6 is a partial, side sectional schematic illustration of a lock device.

Referring to FIG. 6, the first lock device 106A and/or the second lock device 106B may each be configured as a splined lock device 122; e.g., a splined coupling. The lock device 122 of FIG. 6, for example, includes an inner lock element 124 (e.g., a splined shaft), an outer lock element 126 (e.g., a splined sleeve) and an actuator 128. The inner lock element 124 is rotatable about the axis 28, 40, 100. The outer lock element 126 is rotationally fixed about the axis 28, 40, 100. However, the actuator 128 is configured to move (e.g., axially translate) the outer lock element 126 along the axis 28, 40, 100 and the inner lock element 124 between an unlocked position (see dashed line in FIG. 6) and a locked position (see solid line in FIG. 6; see also FIG. 7). At the unlocked position, inner splines 130 of the outer lock element 126 are disengaged (e.g., spaced) from outer splines 132 of the inner lock element 124. At the locked position, the inner splines 130 of the outer lock element 126 are engaged (e.g., meshed) with the outer splines 132 of the inner lock element 124 (see also FIG. 7). With this arrangement, when the lock device 122 is unlocked and its outer lock element 126 is in the unlocked position, the inner lock element 124 may rotate (e.g., freely, unencumbered by the outer lock element 126) about the axis 28, 40, 100. However, when the lock device 122 is locked and its outer lock element 126 is in the locked position of FIG. 7, the outer lock element 126 is meshed with the inner lock element 124 and prevents rotation of the inner lock element 124 about the axis 28, 40, 100.

Figure 7:
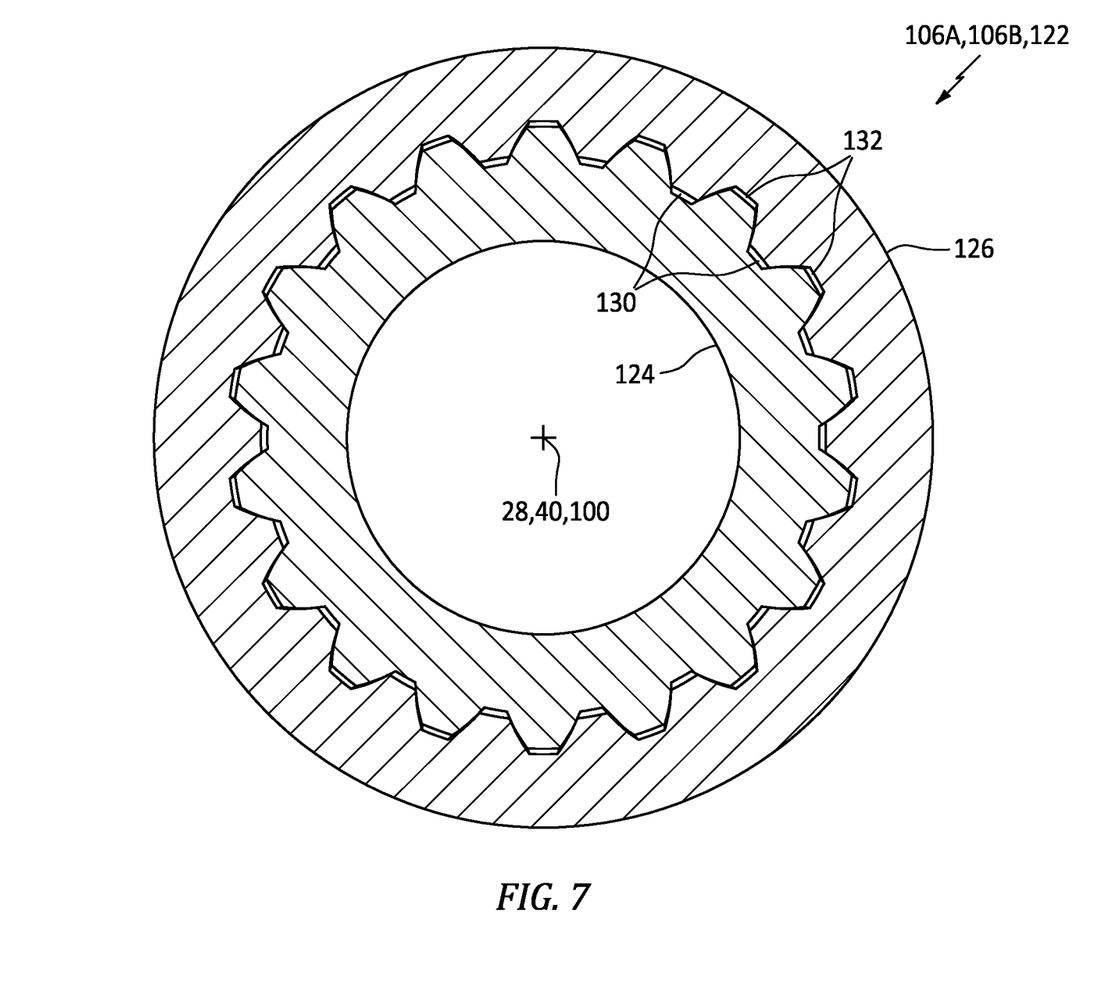
FIG. 7 is a cross-sectional illustration of the lock device of FIG. 6.

Referring to FIGS. 1 and 6, the inner lock element 124 of the first lock device 106A may be configured as part of or may be attached (directly or indirectly) to the first propulsor shaft 80, or any other element rotatable therewith. The inner lock element 124 of the second lock device 106B may be configured as part of or may be attached (directly or indirectly) to the geartrain output shaft 81, or any other element rotatable therewith. While the inner lock element 124 of FIGS. 6 and 7 is described as the rotating element and the outer lock element 126 is described as the rotationally fixed element, the operation of these elements may be switched in other embodiments. In particular, the inner lock element 124 may alternatively be configured as the rotationally fixed element and axially translatable by the actuator 128, and the outer lock element 126 may be configured as the rotating element. Furthermore, various other types of rotational lock devices are known in the art, and the present disclosure is not limited to any particular ones thereof.

Figure 8:
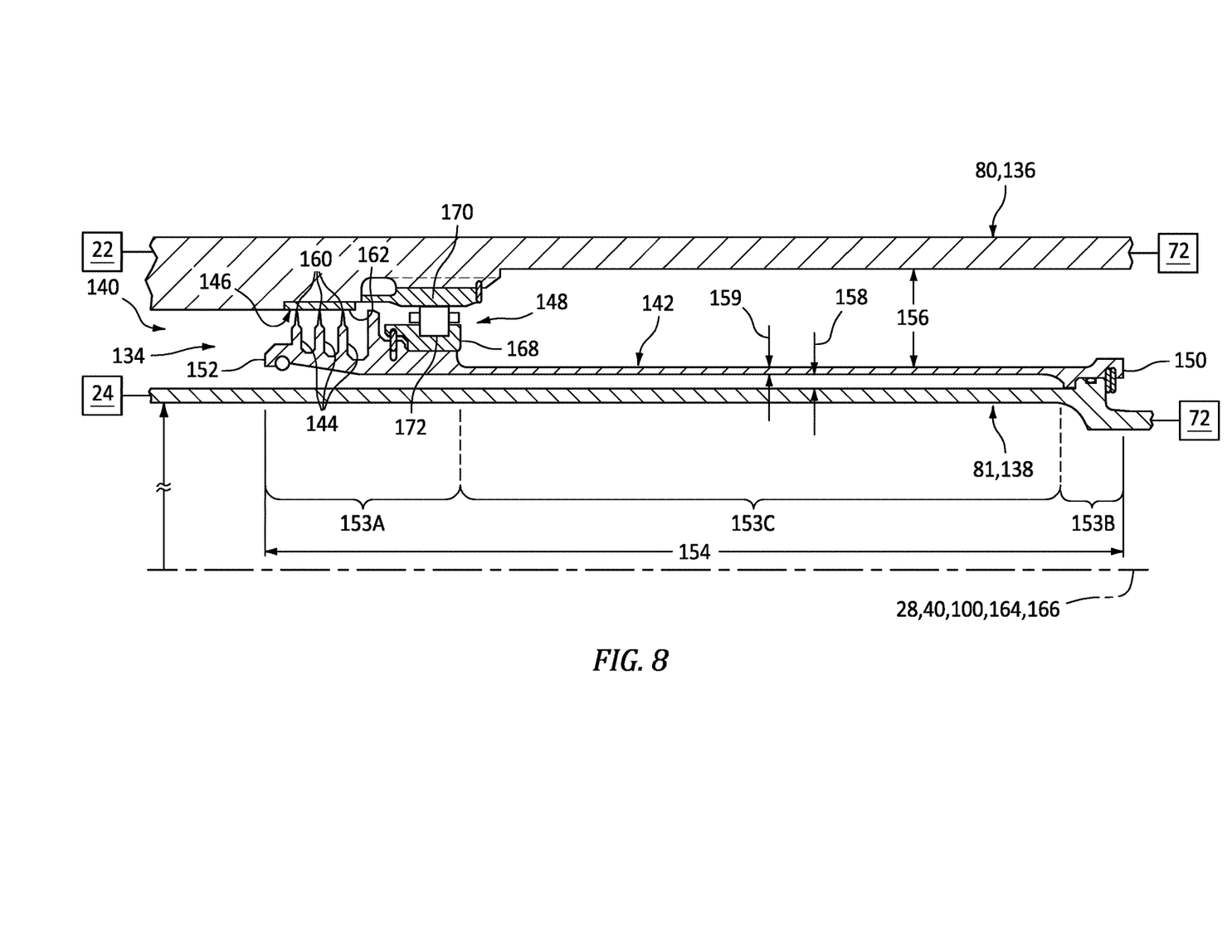
FIG. 8 is a partial sectional illustration of a seal assembly for sealing a gap between inner and outer rotating structures.
Figure 9:
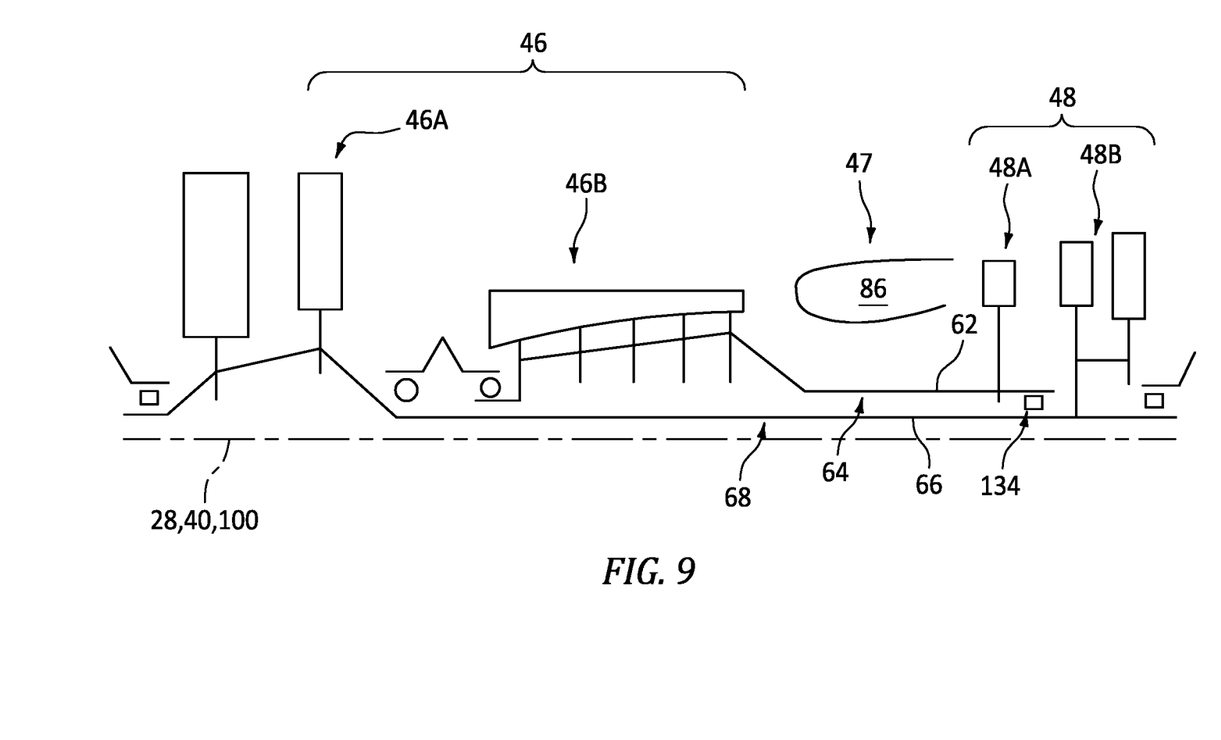
FIG. 9 is a partial schematic illustration of a core of the aircraft propulsion system with another seal assembly.
Figure 10:
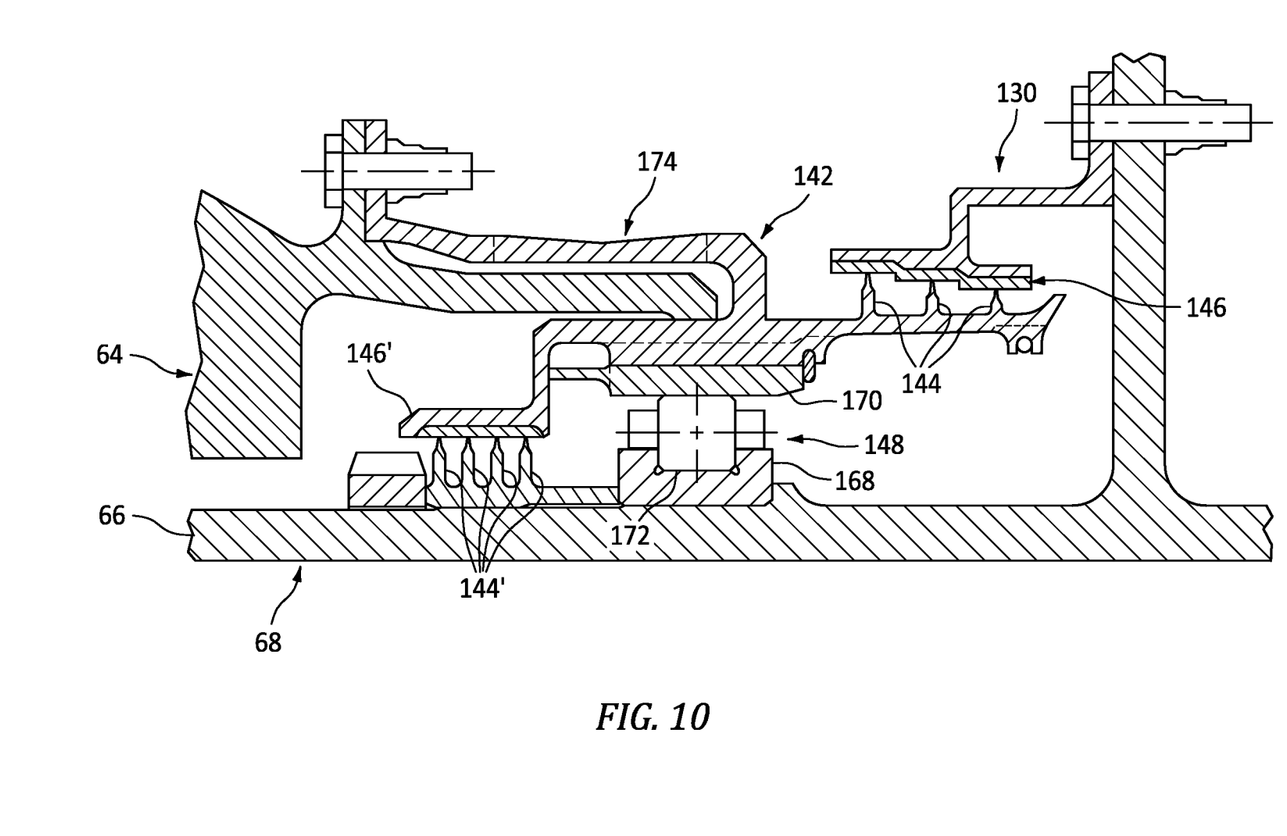
FIG. 10 is a partial sectional illustration of another seal assembly for sealing a gap between inner and outer rotating structures.

The aircraft propulsion system 20 of FIG. 1 also includes a seal assembly 134. Referring to FIG. 8, this seal assembly 134 is configured to provide a compliant seal interface between a first rotating structure 136 (e.g., an outer rotating structure) and a second rotating structure 138 (e.g., an inner rotating structure). The seal assembly 134 of FIG. 8, for example, is configured to seal an annular gap 140 between the first propulsor shaft 80 (e.g., a first shaft of the first rotating structure 136) and the geartrain output shaft 81 (e.g., a second shaft of the second rotating structure 138); however, the seal assembly 134 of the present disclosure may also be utilized to provide a seal interface between other radially adjacent rotating components within the aircraft propulsion system 20; e.g., see FIGS. 9 and 10.

The seal assembly 134 of FIG. 8 includes a tubular arm 142 (e.g., a flexible arm), one or more annular seal elements 144 and at least one seal land 146. The seal assembly 134 of FIG. 8 also includes a bearing 148.

The arm 142 circumscribes, is cantilevered from and/or extends axially along the second rotating structure 138 and its geartrain output shaft 81. The arm 142 of FIG. 5, for example, extends axially along the axis 28, 40, 100 between and to a first end 150 of the arm 142 and a second end 152 of the arm 142. The arm 142 is mounted to the second rotating structure 138 and its geartrain output shaft 81 at the arm first end 150 and at an outer side of the geartrain output shaft 81. The arm second end 152 is radially displaced from the second rotating structure 138 and its geartrain output shaft 81 such that a distal end portion 153A of the arm 142 at (e.g., on, adjacent, proximate) the arm second end 152 may move radially (e.g., up and/or down) relative to the second rotating structure 138 and its geartrain output shaft 81 while a proximal end portion 153B of the arm 142 at the arm first end 150 may remain fixed with the second rotating structure 138 and its geartrain output shaft 81. An intermediate portion 153C of the arm 142 may bend, flex and/or otherwise resiliently deform to facilitate the relative (e.g., radial) movement between the distal end portion 153A and the proximal end portion 153B. The distal end portion 153A of FIG. 8 supports the seal elements 144 and/or the bearing 148. The proximal end portion 153B of FIG. 8 mounts the arm 142 to the second rotating structure 138 and its geartrain output shaft 81. The intermediate portion 153C of FIG. 8 extends axially between and to the distal end portion 153A and the proximal end portion 153B.

The arm 142 has an axial length 154 extending axially along the axis 28, 40, 100 between and to the arm first end 150 and the arm second end 152. This arm length 154 may be sized greater than a (e.g., minimum, maximum or average) radial distance 156 extending radially between and to the arm 142 and the first rotating structure 136 and its first propulsor shaft 80. The arm length 154, for example, may be greater than three times (3×) the first distance 156; e.g., between five times (5×) and twenty times (20×) the first distance 156. The arm length 154 may also or alternatively be sized greater than a (e.g., minimum, maximum or average) radial distance 158 extending radially between and to the arm 142 and the second rotating structure 138 and its geartrain output shaft 81. The arm length 154, for example, may be greater than ten times (10×) the second distance 158; e.g., between fifteen times (15×) and forty times (40×) the second distance 158. The present disclosure, however, is not limited to the foregoing exemplary dimensional relationships.

The intermediate portion 153C may axially span at least fifty percent (50%) of the arm length 154. The intermediate portion 153C of FIG. 8, for example, may axially span between fifty-five percent (55%) and eighty-five percent (85%) of the arm length 154. The intermediate portion 153C has a (e.g., radial) thickness 159, which may be uniform (e.g., constant) axially along the intermediate portion 153C. This arm thickness 159 may be sized less than the first distance 156 and/or the second distance 158. The arm length 154 may also or alternatively be sized greater than twenty times (20×) the arm thickness 159; e.g., between seventy-five times (75×) and two-hundred times (200×) the arm thickness 159. The present disclosure, however, is not limited to the foregoing exemplary dimensional relationships. For example, the arm length 154 and/or the arm thickness 159 may be tailored to provide (e.g., tune) the arm 142 with a select stiffness and/or rotordynamic benefit.

At least the intermediate portion 153C (e.g., the entire arm 142) may be non-perforated. The arm 142 may thereby form a fluid barrier to block fluid flow across a substantial portion of the gap 140 between the second rotating structure 138 and the seal elements 144.

The seal elements 144 are connected to (e.g., formed integral with or otherwise attached to) the arm 142 at the arm second end 152. Each of the seal elements 144 may be configured as or otherwise include an annular knife edge seal element. Each of the seal elements 144 of FIG. 8, for example, is configured as an annular protrusion which projects radially outward (away from the axis 28, 40, 100) from an outer peripheral surface of the arm 142 to a respective distal tip 160; e.g., pointed edge. Each of these seal elements 144 is configured to form a seal interface with the seal land 146 such that little or no gas and/or liquid fluid (e.g., air, lubricant, etc.) may pass axially along the seal land 146 and across the seal element tips 160.

The seal land 146 is arranged with the first rotating structure 136 and its first propulsor shaft 80. This seal land 146 may be formed integral with the first rotating structure 136 and its first propulsor shaft 80. Alternatively, the seal land 146 may be an insert (e.g., a bushing) or other component attached to the first rotating structure 136 and its first propulsor shaft 80. The seal land 146 of FIG. 8 includes a (e.g., cylindrical) inner surface 162 which forms the seal interface with one or more or all of the seal elements 144 at their tips 160.

The bearing 148 may position (e.g., radially locate) the seal elements 144 relative to the seal land 146. The bearing 148 of FIG. 8, for example, is configured to support and/or locate the distal portion 153A of the arm 142 proximate the arm second end 152 to the first rotating structure 136 and its first propulsor shaft 80. The bearing 148 may thereby maintain clearance/radial positioning between the seal elements 144 and the seal land 146 even where there is a slight misalignment (e.g., offset, pitch, etc.) between a centerline/rotational axis 164 of the first propulsor shaft 80 and a centerline/rotational axis 166 of the geartrain output shaft 81. The seal assembly 134 of FIG. 8 may therefore accommodate relative movements between the rotating structures 136 and 138/the shafts 80 and 81 while maintaining a seal between the rotating structures 136 and 138/the shafts 80 and 81.

The bearing 148 may be configured as a rolling element bearing. The bearing 148 of FIG. 8, for example, includes a bearing inner race 168, a bearing outer race 170 and one or more bearing rolling elements 172. The inner race 168 is connected to (e.g., formed integral with or mounted to) the arm 142. This inner race 168 circumscribes the arm 142. The outer race 170 is connected to (e.g., formed integral with or mounted to) the first rotating structure 136 and its first propulsor shaft 80. The outer race 170 is axially aligned with and circumscribes the inner race 168. The outer race 170 also circumscribes an array of the rolling elements 172. The rolling elements 172 are arranged circumferentially about the axis 28, 40, 100, 164, 166 in an annular array, radially between the inner race 168 and the outer race 170. Each of these rolling elements 172 is configured to radially engage (e.g., contact) the inner race 168 and the outer race 170.

The seal elements 144 are described above as being configured with the arm 142, and the seal land 146 is described above as being configured with the other rotating structure; e.g., the first propulsor shaft 80. In other embodiments, however, this arrangement may be reversed for at least one seal interface. For example, referring to FIG. 10, the seal land 146' is arranged with the arm 142 and the seal element(s) 144' are arranged with the other rotating structure; e.g., the low speed rotating structure 68. Here, the arm 142 may also be a perforated member. The arm 142 of FIG. 10, for example, includes a squirrel cage spring structure 174.

Figure 11:
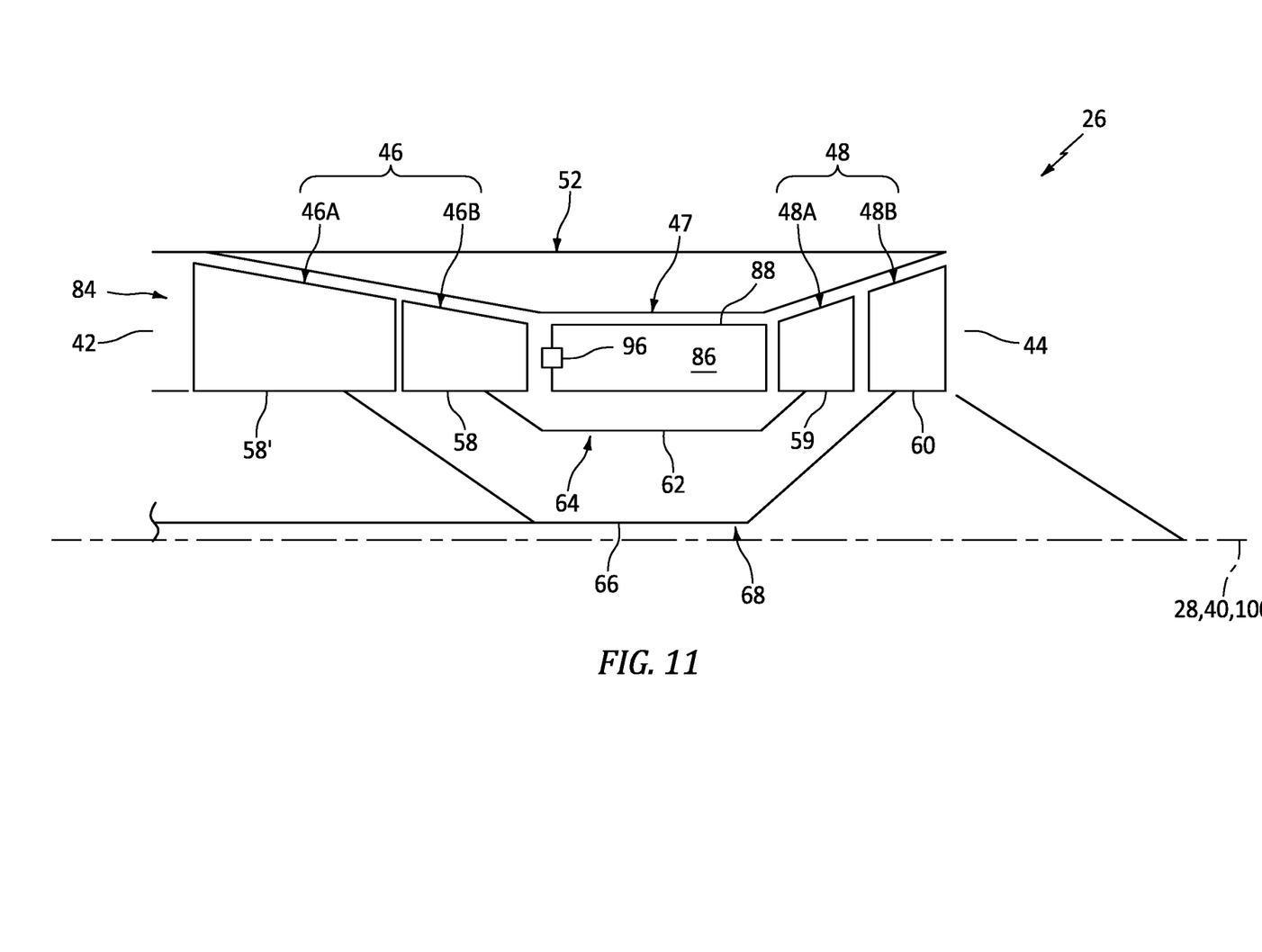
FIG. 11 is a partial, schematic illustration of a gas turbine engine core.

In some embodiments, referring to FIG. 1, the low speed rotating structure 68 may be configured without a compressor rotor. In other embodiments, referring to FIG. 11 (see also FIG. 2), the low speed rotating structure 68 may include a low pressure compressor (LPC) rotor 58' arranged within a low pressure compressor (LPC) section 46A of the compressor section 46. In such embodiments, the compressor rotor 58 may be a high pressure compressor (HPC) rotor within a high pressure compressor (HPC) section 46B of the compressor section 46.

Figure 12:
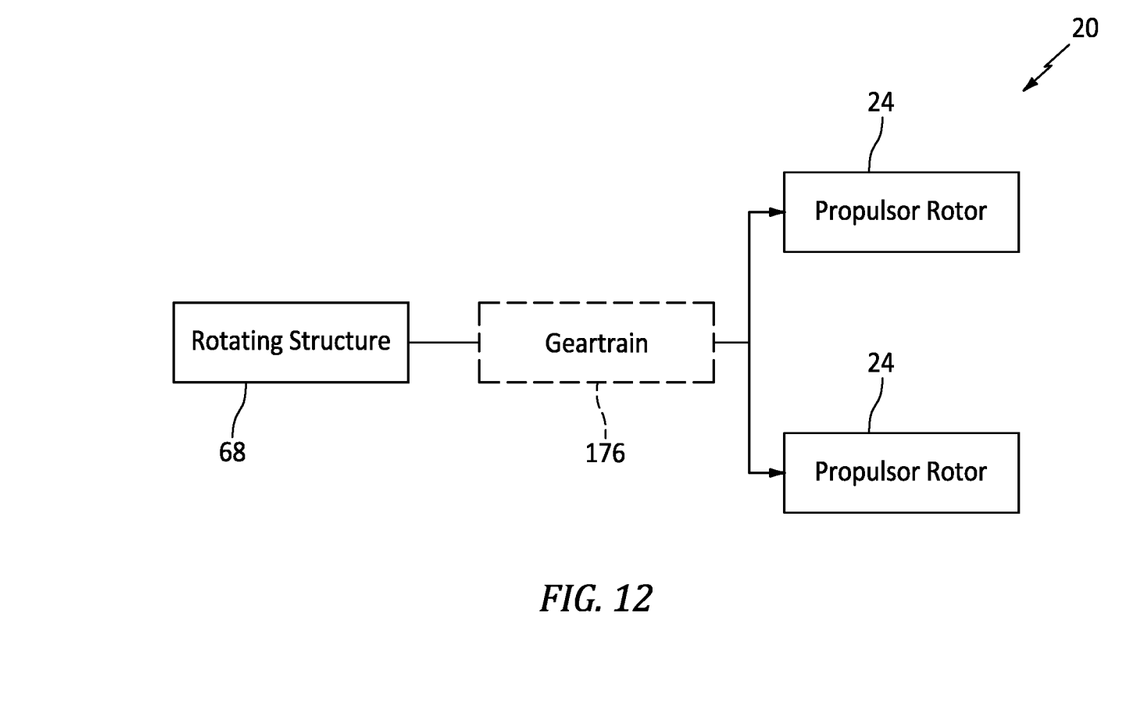
FIG. 12 is a partial, schematic illustration of a rotating structure coupled to and driving multiple propulsor rotors for generating propulsive lift.

The engine core 26 (e.g., see FIG. 1) may have various configurations other than those described above. The engine core 26, for example, may be configured with a single spool, with two spools (e.g., see FIG. 1), or with more than two spools. The engine core 26 may be configured with one or more axial flow compressor sections, one or more radial flow compressor sections, one or more axial flow turbine sections and/or one or more radial flow turbine sections. The engine core 26 may be configured with any type or configuration of annular, tubular (e.g., CAN), axial flow and/or reverser flow combustor. The present disclosure therefore is not limited to any particular types or configurations of gas turbine engine cores. Furthermore, it is contemplated that the engine core 26 of the present disclosure may drive more than the two propulsor rotors 22 and 24, or a single one of the propulsor rotors 22 and 24 and/or one or more other mechanical loads; e.g., electric machines, electric generators, electric motors, etc. The aircraft propulsion system 20, for example, may include two or more of the first propulsor rotors 22 and/or two or more of the second propulsor rotors 24. For example, the aircraft propulsion system 20 of FIG. 12 includes multiple second propulsor rotors 24 rotatably driven by the low speed rotating structure 68. These second propulsor rotors 24 may rotate about a common axis. Alternatively, each second propulsor rotor 24 may rotate about a discrete axis where, for example, the second propulsor rotors 24 are laterally spaced from one another and coupled to the low speed rotating structure 68 through a power splitting geartrain 176. Furthermore, the present disclosure is not limited to aircraft propulsion system applications. The engine core 26, for example, may be configured to drive an electrical generator in addition to or alternatively to the one or more propulsor rotors 22, 24.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:
   a first rotating structure;
   a second rotating structure, the second rotating structure extending axially through a bore of the first rotating structure;
   a seal assembly configured to seal an annular gap radially between the first rotating structure and the second rotating structure, the seal assembly comprising an arm, a seal element and a seal land, the arm cantilevered from and extending axially along the second rotating structure, the seal element connected to the arm and forming a seal interface with the seal land, and the seal land connected to the first rotating structure; and
   a bearing disposed radially between the arm and the first rotating structure, the bearing supporting the arm relative to the first rotating structure.

2. An assembly for an aircraft, comprising:
   a first rotating structure rotatable about a first axis;
   a second rotating structure rotatable about a second axis;
   a seal assembly configured to seal an annular gap radially between the first rotating structure and the second rotating structure, the seal assembly further configured to accommodate misalignment between the first axis and the second axis, and the seal assembly including a seal land, a seal element and a flexible member connecting the seal element to the second rotating structure, the seal land arranged with the first rotating structure, and the seal element configured to provide a seal interface with the seal land; and
   a rolling element bearing disposed radially between the flexible member and the first rotating structure, the rolling element bearing radially locating a portion of the flexible member, axially proximate the seal element, relative to the first rotating structure.

3. The assembly of claim 2, wherein the flexible member comprises an arm cantilevered from the second rotating structure.

4. An assembly for an aircraft, comprising:
a first rotating structure;
a second rotating structure;
a seal assembly configured to seal an annular gap radially between the first rotating structure and the second rotating structure, the seal assembly comprising an arm, a seal element and a seal land, the arm cantilevered from and extending axially along the second rotating structure, the seal element connected to the arm and forming a seal interface with the seal land, and the seal land connected to the first rotating structure; and
a bearing disposed radially between the arm and the first rotating structure, the bearing supporting the arm relative to the first rotating structure, and the bearing comprising a bearing inner race, a bearing outer race, and a bearing roller element disposed radially between and engaged with the bearing inner race and the bearing outer race.

5. The assembly of claim 4, wherein
the bearing inner race is connected to the arm;
the bearing outer race is connected to the first rotating structure; and
the bearing roller element is one of a plurality of bearing roller elements arranged circumferentially about a centerline axis of the bearing, and each of the plurality of bearing roller elements is disposed radially between and engaged with the bearing inner race and the bearing outer race.

6. The assembly of claim 4, wherein
the bearing inner race is integral with the arm; and
the bearing outer race is integral with the first rotating structure.

* * * * *